(12) United States Patent  
Parisi et al.

(10) Patent No.: US 7,637,515 B2
(45) Date of Patent: Dec. 29, 2009

(54) STABILIZER BRACKET

(75) Inventors: Brian M. Parisi, Evanston, IL (US); William J. Curley, Jr., Waterbury, CT (US); Anthony Pascariello, Southington, CT (US)

(73) Assignee: Illinois Tool Works Inc., Glenview, IL (US)

( * ) Notice: Subject to any disclaimer, the term of this patent is extended or adjusted under 35 U.S.C. 154(b) by 106 days.

(21) Appl. No.: 11/824,366

(22) Filed: Jun. 29, 2007

(65) Prior Publication Data

US 2008/0100016 A1 May 1, 2008

Related U.S. Application Data

(60) Provisional application No. 60/854,483, filed on Oct. 26, 2006.

(51) Int. Cl.
*B60G 3/12* (2006.01)
(52) U.S. Cl. .................... 280/124.13; 24/284
(58) Field of Classification Search ............ 280/124.13; 403/224, 225; 267/141–141.3; 24/284
See application file for complete search history.

(56) References Cited

U.S. PATENT DOCUMENTS

| | | | | |
|---|---|---|---|---|
| 3,448,994 A * | 6/1969 | King et al. | ............ | 280/124.106 |
| 4,623,164 A * | 11/1986 | Cassel et al. | .......... | 280/124.106 |
| 4,707,149 A * | 11/1987 | Hahle | .......................... | 384/294 |
| 4,854,766 A * | 8/1989 | Hein | .......................... | 403/224 |
| 5,565,251 A * | 10/1996 | Tang et al. | ................. | 428/36.8 |
| 6,513,801 B1 * | 2/2003 | McCarthy | .................... | 267/293 |
| 6,889,988 B2 * | 5/2005 | Cai et al. | ............. | 280/124.107 |
| 6,893,034 B2 * | 5/2005 | Fader | ................. | 280/124.166 |
| 6,971,640 B2 * | 12/2005 | Joseph | ........................ | 267/141 |
| 7,341,245 B2 * | 3/2008 | Joseph | ........................ | 267/141 |
| 7,380,775 B2 * | 6/2008 | Niwa et al. | ................. | 267/293 |

\* cited by examiner

*Primary Examiner*—Faye M. Fleming
(74) *Attorney, Agent, or Firm*—Mark W. Croll; Paul F. Donovan

(57) ABSTRACT

Embodiments of the present invention provide a stabilizer bracket configured to securely stabilize a sway bar with respect to a vehicle frame. The stabilizer bracket includes a bar clamp defining an insulator retention area, and at least one fastener mount integrally formed with the bar clamp. The bar clamp and the fastener mount are formed as a single unit from a single piece of material.

16 Claims, 5 Drawing Sheets

STABILIZER BRACKET

RELATED APPLICATIONS

This application relates to and claims priority benefits from U.S. Provisional Patent Application No. 60/854,483 entitled "Stabilizer Bracket," filed Oct. 26, 2006, which is hereby incorporated by reference in its entirety.

FIELD OF THE INVENTION

Embodiments of the present invention generally relate to stabilizer brackets, and more particularly, to stabilizer brackets adapted for use in automobile applications, such as for use with suspension sway bars.

BACKGROUND OF THE INVENTION

A sway bar is a vehicle suspension device that connects opposite wheels, i.e., left and right wheels, together through short lever arms linked by a torsion spring. The sway bar increases roll stiffness (i.e., resistance to roll in turns) of the suspension system independent of its spring rate in a vertical direction.

A typical sway bar passes through a rubber insulator that is secured to the vehicle body through a bracket that is bolted down. Typically, two brackets secure the sway bar in place. That is, one bracket secures the sway bar on a left side, while another bracket secures the sway bar on a right side.

FIG. 1 illustrates an isometric view of a known stabilizer bracket assembly 10 configured to secure a sway bar (not shown) to a vehicle frame (not shown). The stabilizer bracket assembly 10 includes a bar clamp 12, a first fastener tube 14, a second fastener tube (not shown), and a insulator 16 that may be formed of rubber.

The bar clamp 12 is C- or U-shaped and defines an insulator retention area 18. The fastener tubes 14 are separate components that are welded to ends of the bar clamp 12. As such, three separate components are formed in order to manufacture the stabilizer bracket assembly 10. In particular, the bar clamp 12 is formed, such as through a stamping process, and the two separate and distinct fastener tubes 14 are formed. After the three separate components are formed, the two fastener tubes 14 are then welded to the bar clamp 12.

The insulator 16 includes a bar channel 20 configured to receive and retain a bar or rod, such as a sway bar. The insulator 16 is positioned within the insulator retention area 18.

When securing a sway bar to a vehicle frame, the insulator 16 is inserted onto the sway bar through a slit formed on the insulator 16. The bar clamp 12 is then fit over the insulator 16 and retained by a press fit condition between the insulator 16 and the bar clamp 12. The resulting assembly including the sway bar and bar clamps 12 and insulators 16 on either end is then positioned and fastened to a vehicle body at predetermined location.

FIG. 2 illustrates a cross-sectional view of the known stabilizer bracket 10. As shown in FIG. 2, a rod or bar 28, such as a sway bar, is positioned within the bar channel 20. As noted above, the fastener tubes 14 are separate pieces that are seam-welded to the sides of the bar clamp 12. Because the fastener tubes 14 are seam-welded to the bar clamp 12, the seams or weld joints 24 create stress risers on the bar clamp assembly 10. In fact, the weld joints 24 are typically fatigue zones that are susceptible to weakening when subjected to increased temperatures and pressures.

During the assembly process, the fastener tubes 14 may not be consistently welded to the bar clamp 12 according to print specifications. As such, numerous stabilizer bracket assemblies 10 may be susceptible to fracturing, warping, or otherwise stressing about the weld joints 24. Thus, a sway bar may dislodge from, or loosen with respect to, a vehicle frame due to the weakened areas of the stabilizer bracket assembly 10.

Moreover, longitudinal edges 26 of the bar clamp 12 may bend, warp, contort, or distort during normal operation. Consequently, the securing force exerted into the sway bar by the bar clamp 12 may be uneven.

SUMMARY OF THE INVENTION

Embodiments of the present invention provide a single piece, structurally reliable stabilizer bracket that does not include the stress risers or weakened areas of a known stabilizer bracket.

Certain embodiments of the present invention provide a stabilizer bracket configured to secure a bar with respect to a structure that includes a bar clamp integrally formed with at least one fastener mount, such as first and second fastener mounts. The bar clamp and the fastener mount(s) are formed as a single unit from a single piece of material. That is, a single piece of material, such as drawn metal, is bent, folded or the like, to form the bar clamp and the fastener mount(s). As such, the stabilizer bracket is devoid of weakened areas, such as weld seams, weld joints, or the like.

The bar clamp may include a strap having first and second ends that are integrally connected to first and second walls or beams, respectively. The strap may also include a curved or folded-over portion, such as folded over edges (or edges formed having a C cross section), that provides strength to the strap. An insulator retention area may be defined between the strap and the first and second beams.

The fastener mounts integrally connect to the first and second beams, respectively. Each of the fastener mounts may comprise a base integrally formed with a wall, which in turn integrally formed with a tab having a fastener bearing surface. The base, wall, and the tab are formed by bending, folding, or otherwise manipulating a portion of the single piece of material.

The tab may also include an extruded fastener barrel having a fastener passage. A portion of the fastener barrel abuts the base, thereby bracing the tab with respect to the base.

The stabilizer bracket may also include a rubber insulator having a bar channel formed therethrough. The rubber insulator is positioned within the insulator retention area.

The stabilizer bracket may also include support walls integrally spanning from the first and second fastener mounts to the first and second beams. The support walls provide additional bracing support between the fastener mounts and the first and second beams. To increase bracing strength, portions of the support walls may be canted.

Figure 1:
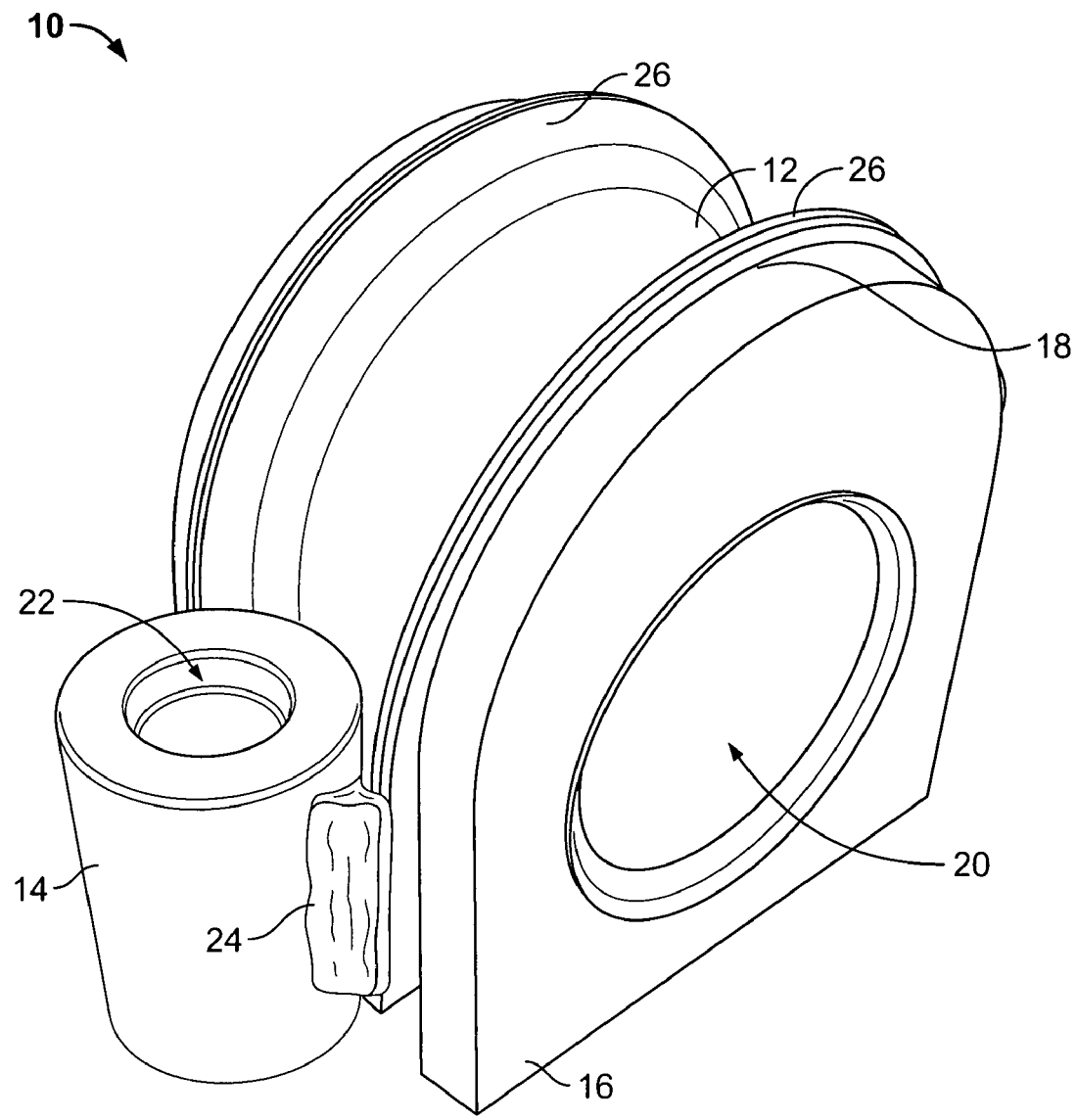
FIG. 1 illustrates an isometric view of a known stabilizer bracket assembly configured to secure a sway bar to a vehicle frame.
Figure 2:
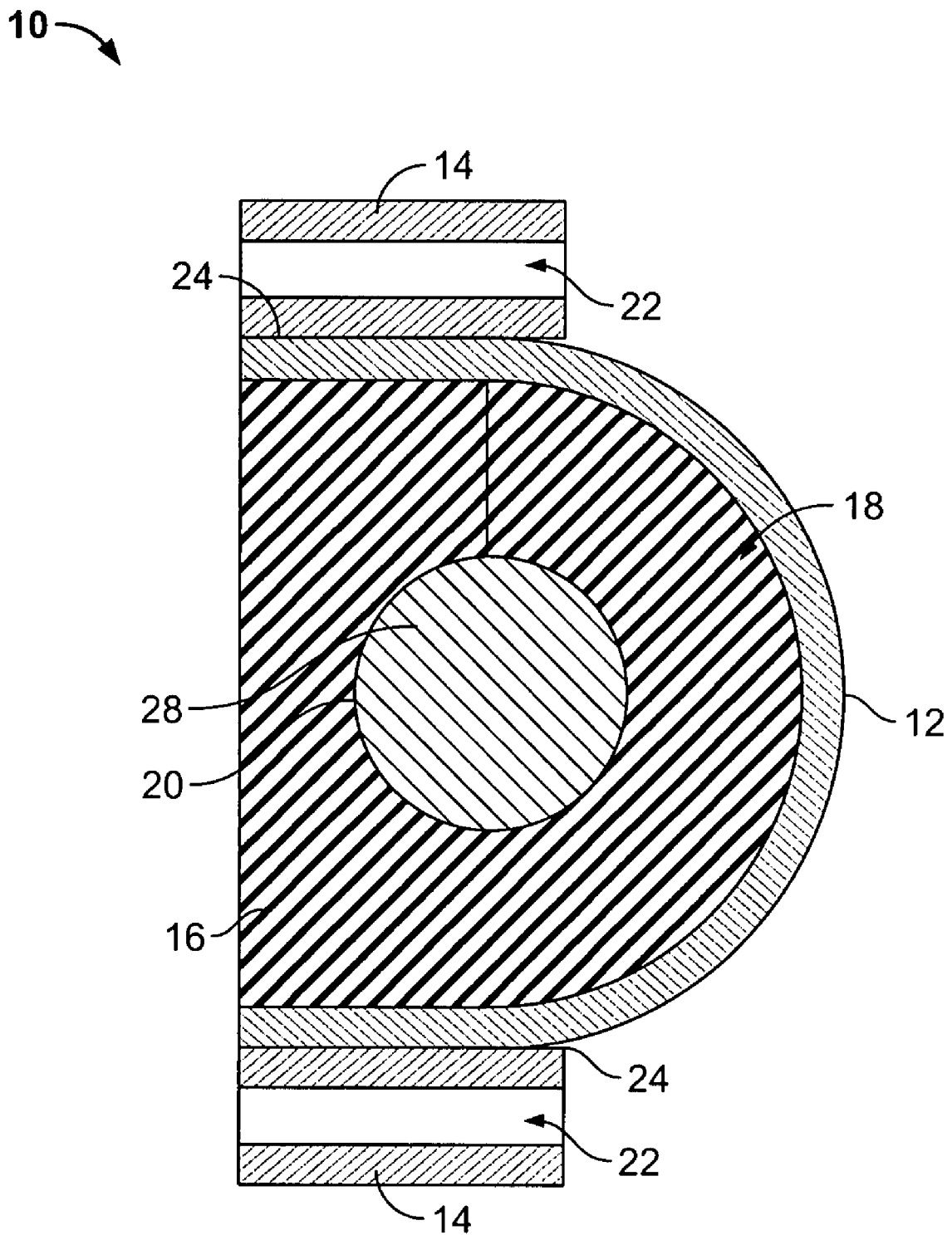
FIG. 2 illustrates a cross-sectional view of a known stabilizer bracket.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 3:
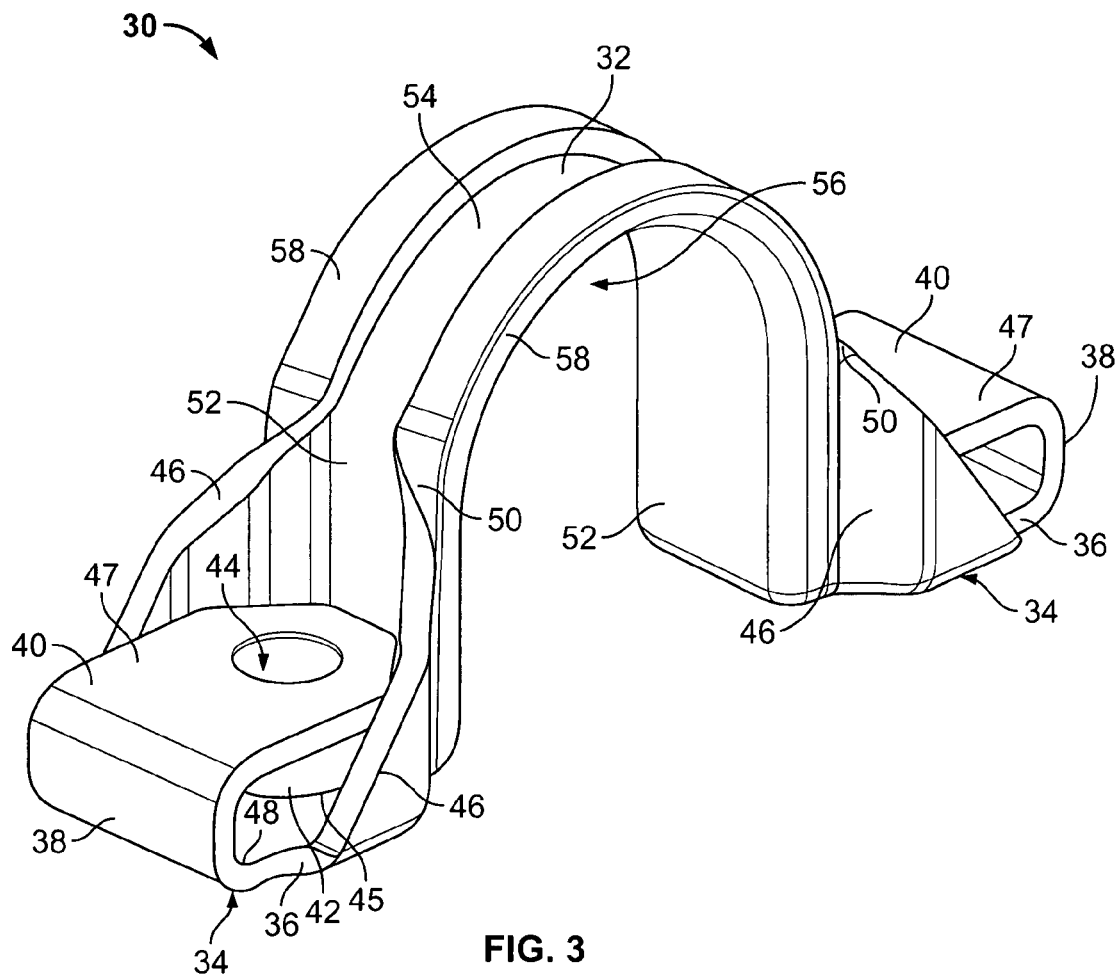
FIG. 3 illustrates an isometric view of a stabilizer bracket according to an embodiment of the present invention.

FIG. 3 illustrates an isometric view of a stabilizer bracket 30 according to an embodiment of the present invention. The stabilizer bracket 30 is formed from a single, unitary piece of drawn metal. That is, all components of the stabilizer bracket 30 are integrally formed with one another, and are devoid of any fastening seams or joints, such as weld joints. The stabilizer bracket 30 includes a bar clamp 32 integrally formed and connected to fastener mounts 34. One fastener mount 34 is integrally formed with and connected to one side of the bar clamp 12, while the other fastener mount 34 is integrally formed with and connected to an opposite side of the bar clamp 12.

During the forming process, the bar clamp 12 and the fastener mounts 34 are bent and formed into position from the single piece of drawn metal. Each fastener mount 34 includes a base 36 integrally connected to an upright wall 38 that is bent at an angle with respect to the base 36. For example, the wall 38 may be bent at a ninety degree angle with respect to the base 36. In turn, a flap connected to the wall 38 is inwardly bent to form an upper tab 40 that is positioned over the base 36. The upper tab 40 and the base 36 may be parallel with one another. Optionally, the wall 38 may be a full radius wall. As such, the wall 38 would be rounded, but not necessarily upright or angular.

A fastener barrel 42 having a fastener channel 44 is extruded through the upper tab 40. The fastener barrel 42 is configured to receive and retain a fastener, such as a bolt. The fastener channel 44 is aligned with a fastener through hole (not shown) formed in the base 36. As shown in FIG. 3, the extruded fastener barrels 42 are folded back over onto the base 36 to provide column strength. In particular, a distal end 45 of each fastener barrel 42 abuts an upper surface of the base 36. Thus, each fastener barrel 42 provides a brace that separates a bolt head (not shown) from the base 36, thereby preventing the upper tab 40 from collapsing when the bolt (not shown) is tightened. Moreover, an upper fastener bearing surface 47 of the upper tab 40 provides a large area on which a bolt head may rest, thereby providing a large contact surface for the bolt head (as opposed to upper edges of tubes, as shown in FIG. 1, for example).

Lateral support walls 46 extend from edges 48 of the base 36 to upright edges 50 of the bar clamp 32. The lateral support walls 46 cant inwardly toward the upright edges 50 of the bar clamp 32, thereby bracing the fastener mounts 34 with respect to the bar clamp 32. In general, the lateral support walls 46 provide a bracing support between the fastener mounts 34 and the bar clamp 12. As such, the fastener mounts 34 are less likely to bend with respect to the bar clamp 12.

The bar clamp 32 includes upright beams or walls 52, having the upright edges 50, integrally formed with a curved upper strap 54. The curved upper strap 54 and the upright walls 52 may exhibit a C- or U-shape and define an insulator retention area 56 therebetween. Alternatively, the curved upper strap 54 and the upright walls 52 may exhibit other shapes than a C or U. As noted above, the upright walls 52 are integrally formed with, and connect to, the fastener mounts 34.

Longitudinal edges 58 of the curved upper strap 54 are folded or bent over the main body of the curved upper strap 54. The longitudinal edges 58 provide a strengthened area that is not susceptible to bending, twisting, or the like, as compared to a single layer of material. Thus, the curved upper strap 54 of the bar clamp 32 is less likely to warp, distort, contort, or the like when secured to a structure. Additionally, the folded over longitudinal edges 58 prevent the curved upper strap 54 from cracking during the forming process of a flat piece of metal into a U, C or other shape.

Figure 4:
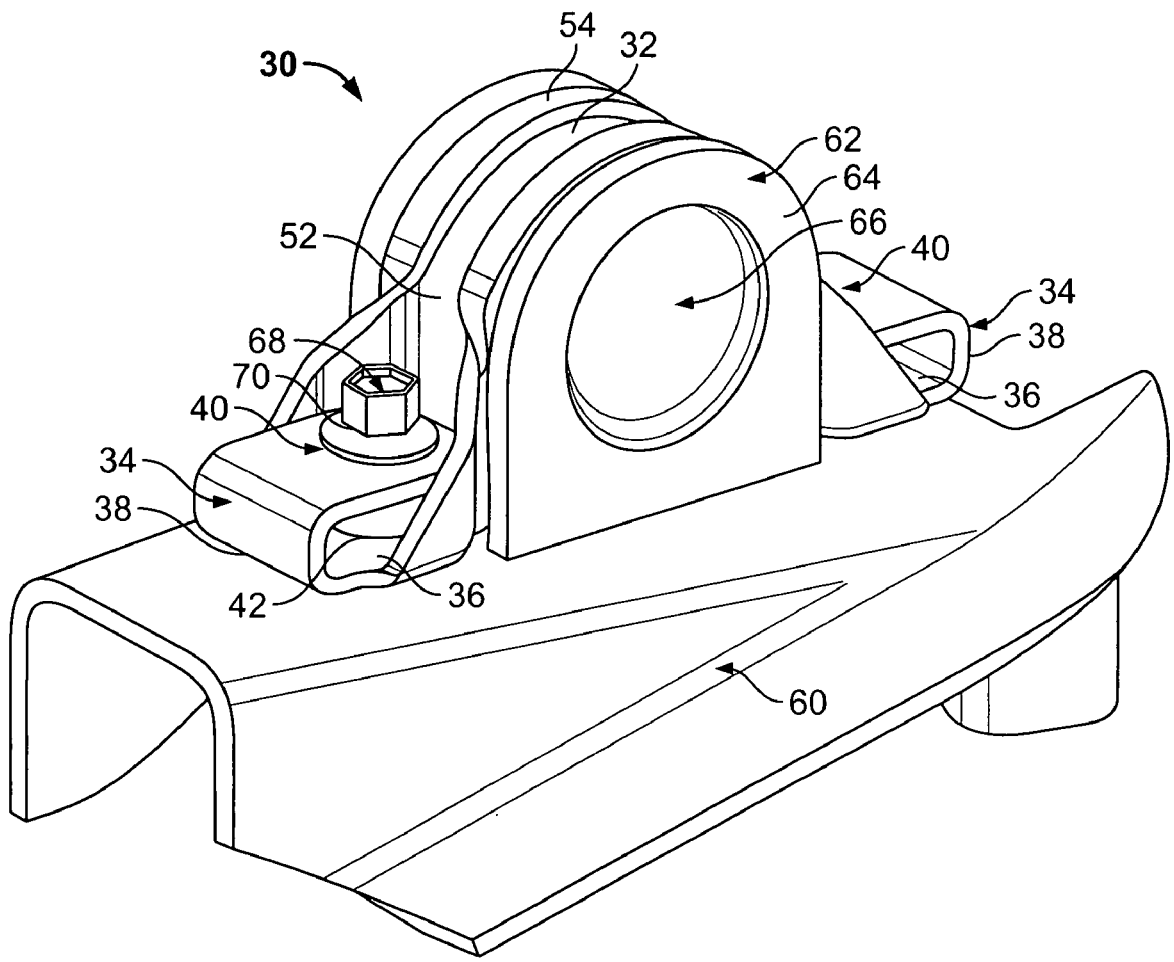
FIG. 4 illustrates an isometric view of a stabilizer bracket secured to a structure according to an embodiment of the present invention.
Figure 5:
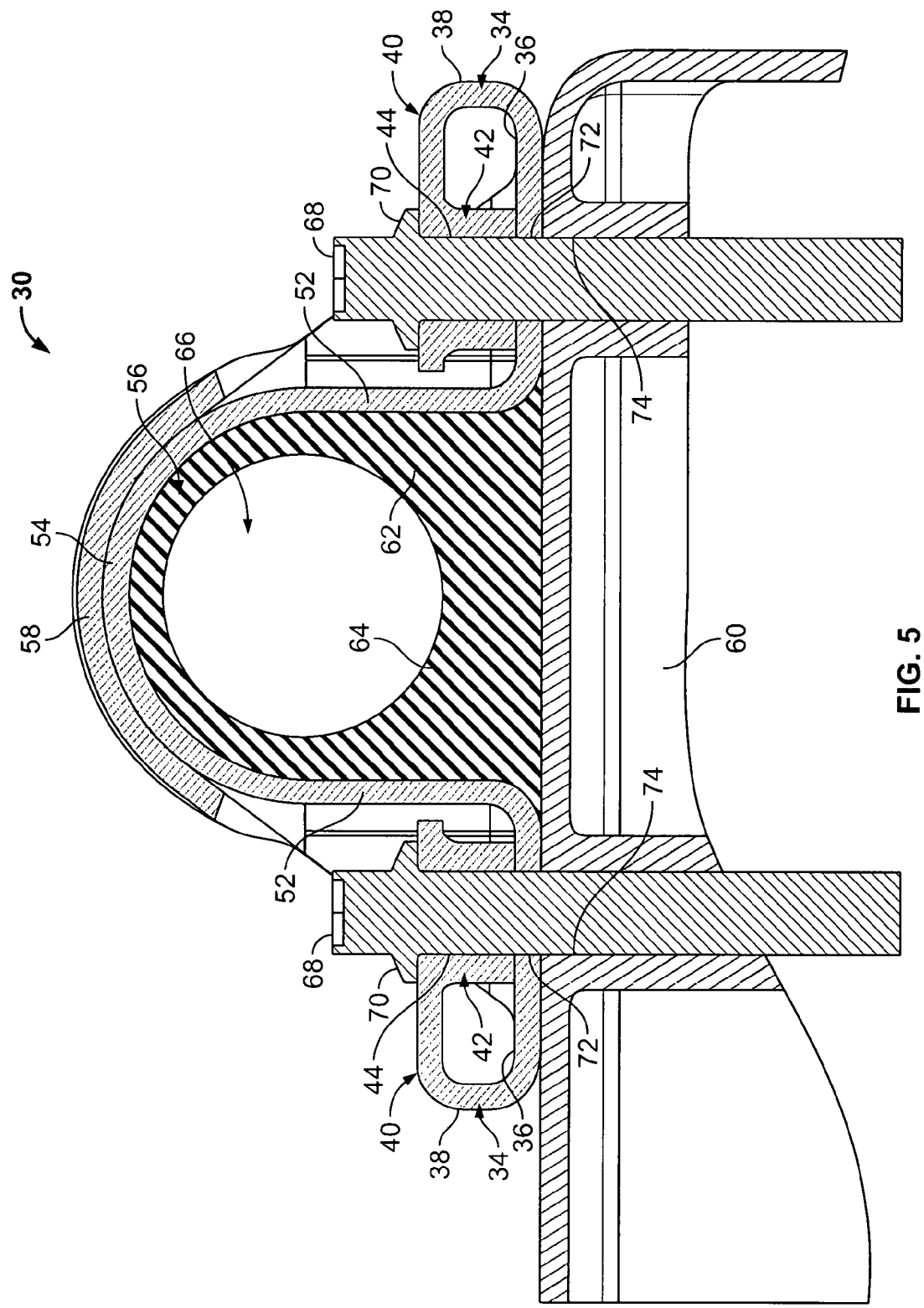
FIG. 5 illustrates a cross sectional view of a stabilizer bracket secured to a structure according to an embodiment of the present invention.

FIG. 4 illustrates an isometric view of the stabilizer bracket 30 secured to a structure 60 according to an embodiment of the present invention. FIG. 5 illustrates a cross sectional view of the stabilizer bracket 30 secured to the structure 60. Referring to FIGS. 4 and 5, the structure may be a portion of a vehicle suspension frame. An insulator 62 is positioned within the insulator retention area 56 defined by the curved upper strap 54 and the upright walls 52 of the bar clamp 32. The insulator 62 includes a main body 64 defining a bar channel 66. A strap cavity (hidden in FIGS. 4 and 5) is defined over an upper surface of the insulator 62 and is configured to retain the curved upper strap 54 therein.

The stabilizer bracket 30 is secured to the structure 60 through fasteners 68, such as bolts. Fastener through holes 72 (shown in FIG. 5) formed through the bases 36 of the fastener mounts 34 are aligned with fastener through holes 74 (shown in FIG. 5) formed in the structure 60. Because the fastener channels 44 (shown in FIGS. 3 and 5) of the fastener barrels 42 are aligned with the fastener through holes 72 formed through the bases 36, the fastener channels 44 are also aligned with the fastener through holes 74 of the structure 60. Once aligned, the fasteners 68 are positioned through the fastener channels 44 and fastener through holes 72 and 74. The fasteners 68 are then tightened. Alternatively, fastener through holes may not necessarily be formed in the structure 60. Instead, weld nuts and the like may replace the through holes.

The upper tabs 40 provide large bearing surfaces for heads 70 of the fasteners 68. The large bearing surfaces allow for reliable and even tightening of the fasteners 68, and are also less likely than upper edges of fastener tubes (as shown in FIG. 1) to warp or otherwise be damaged during the tightening process.

As discussed above, and as shown in FIG. 5, in particular, the fastener mounts 34 are folded-over portions of the single piece of unitary drawn metal with extruded fastener barrels 42 that bracingly abut into the base 36. The fastener barrels 42 separate the fastener heads 70 from the base 36. Thus, the upper tabs 40 of the fastener mounts 34 are prevented from collapsing when the fasteners 68 are tightened Also, as shown in FIG. 5 in particular, longitudinal edges 58 of the curved upper strap 54 are folded over to provide increased strength. Thus, the fortified curved upper strap area is unlikely to curve or warp. However, the longitudinal edges 58 may not be folded over portions. Instead, the longitudinal edges may be curved of formed having a C cross-sectional shape to provide strength and stability.

Embodiments of the present invention provide a one piece stabilizer bracket that eliminates the need to manufacture separate components and the added operation of welding them together. That is, instead of separately forming a bar clamp, and two fastener tubes, the embodiments of the present invention provide an integral stabilizer bracket that is formed from a single piece of material, such as drawn metal. Because they are formed from single pieces of material, the embodiments of the present invention discussed above are devoid of the weakened areas of a known stabilizer bracket.

The embodiments of the present invention may be formed in various shapes and sizes. For example, the curved strap may be a straight strap, while the insulator is block shaped. Additionally, the stabilizer bracket may include more or less integrally formed fastener mounts than those shown and described. Further, embodiments of the present invention may be used with respect to various applications in addition to the sway bar application discussed above.

It is to be understood that terms such as top, bottom, above, below, lower, and upper are relative terms. While these terms have been used to describe embodiments of the invention, such terms are merely used with respect to the drawings. That is, the orientations described may be inverted depending on the placement of the various bar clamp assemblies shown and described.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A stabilizer bracket configured to securely stabilize a sway bar with respect to a vehicle frame, the stabilizer bracket comprising:
   a bar clamp defining an insulator retention area; and
   at least one fastener mount integrally formed with said bar clamp,
   wherein said bar clamp and said at least one fastener mount are formed as a single unit from a single piece of material, said at least one fastener mount has a base integrally formed with a wall, which is in turn integrally formed with a tab having a fastener bearing surface, said base, said wall and said tab are formed by bending a portion of said single piece of material, said tab further includes an extruded fastener barrel formed out of said single piece of material, such that said fastener barrel has a fastener passage, and such that a portion of said fastener barrel abuts said base.

2. The stabilizer bracket of claim 1, wherein said bar clamp comprises a strap having first and second ends that are integrally connected to first and second walls, respectively.

3. The stabilizer bracket of claim 2, wherein said at least one fastener mount comprises first and second fastener mounts integrally connected to said first and second wall, respectively.

4. The stabilizer bracket of claim 1, wherein said bar clamp further comprises a curved or folded-over portion that provides strength to said bar clamp.

5. The stabilizer bracket of claim 1, further comprising a rubber insulator having a bar channel formed therethrough, wherein said rubber insulator is positioned within said insulator retention area.

6. The stabilizer bracket of claim 1, further comprising at least one lateral support wall integrally spanning from said at least one fastener mount to said bar clamp.

7. The stabilizer bracket of claim 1, wherein said at least a portion of said at least one lateral support wall is canted toward said bar clamp.

8. A stabilizer bracket configured to secure a bar with respect to a structure, the stabilizer bracket comprising:
   a bar clamp comprising a strap having first and second ends that are integrally connected to first and second beams, respectively, said strap having a curved or folded-over portion that provides strength to said strap, wherein an insulator retention area is defined between said strap and said first and second beams; and
   first and second fastener mounts integrally connected to said first and second beams, respectively,
   wherein said bar clamp and said at least one fastener mount are formed as a single unit from a single piece of material,
   wherein each of said first and second fastener mounts comprises a base integrally formed with a wall, which is in turn integrally formed with a tab having a fastener bearing surface, said base, said wall and said tab being formed by bending a portion of said single piece of material,
   wherein said tab further comprises an extruded fastener barrel formed out of said single piece of material, such that said fastener barrel has a fastener passage, and such that a portion of said fastener barrel abuts said base.

9. The stabilizer bracket of claim 8, further comprising a rubber insulator having a bar channel formed therethrough, wherein said rubber insulator is positioned within said insulator retention area.

10. The stabilizer bracket of claim 8, further comprising support walls integrally spanning from said first and second fastener mounts to said first and second beams.

11. The stabilizer bracket of claim 8, wherein said portions of said support walls are canted.

12. A stabilizer bracket configured to securely stabilize a sway bar with respect to a vehicle suspension system, the stabilizer bracket comprising:
   a bar clamp comprising a strap having first and second ends that are integrally connected to first and second beams, respectively, said strap having a curved or folded-over portion that provides strength to said strap, wherein an insulator retention area is defined between said strap and said first and second beams;
   first and second fastener mounts integrally connected to said first and second beams, respectively, each of said first and second fastener mounts comprising a base integrally formed with a wall, which is in turn integrally formed with a tab having a fastener bearing surface and an extruded fastener barrel having a fastener passage, wherein a portion of said fastener barrel abuts said base; and
   support walls integrally spanning from said first and second fastener mounts to said first and second beams,
   wherein said bar clamp, said first and second fastener mounts, and said support walls are formed as a single unit from a single piece of material.

13. The stabilizer bracket of claim 12, wherein said base, said wall, and said tab are formed by bending a portion of said single piece of material.

14. The stabilizer bracket of claim 12, further comprising a rubber insulator having a bar channel formed therethrough, wherein said rubber insulator is positioned within said insulator retention area.

15. The stabilizer bracket of claim 12, wherein said portions of said support walls are canted.

16. The stabilizer bracket of claim 12, wherein the stabilizer bracket is devoid of fastening seams.

* * * * *